(12) United States Patent
Dohmann et al.

(10) Patent No.: US 9,259,873 B2
(45) Date of Patent: Feb. 16, 2016

(54) DEVICE AND METHOD FOR COOLING PLASTIC PROFILES

(75) Inventors: Heinrich Dohmann, Hoexter (DE); Thomas Gesper, Guetersloh (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 1056 days.

(21) Appl. No.: 13/387,757

(22) PCT Filed: Jun. 29, 2010

(86) PCT No.: PCT/EP2010/059189
§ 371 (c)(1),
(2), (4) Date: Apr. 27, 2012

(87) PCT Pub. No.: WO2011/000822
PCT Pub. Date: Jan. 6, 2011

(65) Prior Publication Data
US 2012/0205831 A1  Aug. 16, 2012

(30) Foreign Application Priority Data
Jul. 2, 2009 (DE) .......................... 10 2009 027 437

(51) Int. Cl.
*B29C 47/86* (2006.01)
*B29C 47/00* (2006.01)
*B29C 47/92* (2006.01)

(52) U.S. Cl.
CPC ............. *B29C 47/86* (2013.01); *B29C 47/0023* (2013.01); *B29C 47/0026* (2013.01); *B29C 47/864* (2013.01); *B29C 47/92* (2013.01); *B29C 2947/924* (2013.01); *B29C 2947/92104* (2013.01); *B29C 2947/92209* (2013.01); *B29C 2947/92409* (2013.01)

(58) Field of Classification Search
CPC .................................. B29C 47/86; B29C 47/92
USPC ........................................................ 264/40.6
See application file for complete search history.

(56) References Cited

U.S. PATENT DOCUMENTS

| 3,095,608 | A | 7/1963 | Munsell |
| 3,605,787 | A | 9/1971 | Krogfoss et al. |
| 3,609,809 | A | 10/1971 | Slicker |
| 3,724,976 | A | 4/1973 | Rode |
| 4,140,460 | A | 2/1979 | Carlsen |

(Continued)

FOREIGN PATENT DOCUMENTS

| DE | 102005031747 A1 | 1/2007 |
| DE | 202007014876 U1 | 12/2007 |

(Continued)

OTHER PUBLICATIONS

European Patent Office, International Search Report in International Patent Application No. PCT/EP2010/059189 (Nov. 11, 2010).

*Primary Examiner* — Christina Johnson
*Assistant Examiner* — Xue Liu
(74) *Attorney, Agent, or Firm* — Leydig, Voit & Mayer, Ltd.

(57) ABSTRACT

An extrusion line for producing plastics material profiles includes an extruder, a calibration station, and an additional piece of downstream equipment. A mold includes an internal cooling system having a branch for a coolant disposed inside the mold; wherein a coolant flow distribution is controllable.

10 Claims, 4 Drawing Sheets

(56) References Cited

U.S. PATENT DOCUMENTS

| | | |
|---|---|---|
| 4,508,138 A | 4/1985 | Dixon |
| 2002/0150648 A1 | 10/2002 | Cree |
| 2008/0061460 A1 * | 3/2008 | Zimmermann et al. ..... 264/40.1 |
| 2010/0301526 A1 | 12/2010 | Hackl |

FOREIGN PATENT DOCUMENTS

| | | |
|---|---|---|
| DE | 102007050291 A1 | 4/2009 |
| EP | 0795389 A1 | 9/1997 |
| JP | 56005750 A | 1/1981 |

* cited by examiner

DEVICE AND METHOD FOR COOLING PLASTIC PROFILES

CROSS REFERENCE TO PRIOR APPLICATIONS

This application is a U.S. National Phase application under 35 U.S.C. §371 of International Application No. PCT/EP2010/059189, filed on Jun. 29, 2010, and claims benefit to German Patent Application No. DE 10 2009 027 437, filed on Jul. 2, 2009. The International Application was published in German on Jan. 6, 2011 as WO 2011/000822 under PCT Article 21(2).

FIELD

The invention relates to an extrusion line for producing plastics material profiles.

BACKGROUND

To produce pipes, plastics material is melted in an extruder and pressed by a corresponding mould. In a subsequent calibration station, the outer diameter produced in this way is frozen and in water spray baths or full baths the heat is removed from the plastics material via the outer surface. In this case, all the heat must be conducted through the plastics material wall towards the outside, where it is then dissipated by cooling water. The cooling length is disproportionally increased as the pipe wall thickness increases, since the plastics material is a poor heat conductor. In addition, the temperature inside the pipe remains high for a long time and the plastics material has sufficient time to flow downwards owing to gravity. As a result, the pipe wall is always thinner in the upper region than in the lower region.

This process thus has two drawbacks as the pipe wall thickness increases. The cooling length is disproportionately increased and the plastics material flows down the inner wall, resulting in a non-uniform wall thickness distribution. To reduce these drawbacks, a plurality of systems for cooling pipe interiors are described in, for example EP 795 389. However, these systems are very limited in terms of their operation. Since the pipe is cooled both outside and inside, both the outer contour and the inner contour are frozen. If the melt in the centre of the pipe wall then solidifies owing to outward and inward heat dissipation, the severe volume reduction at the transition from the molten state to the solid state results in cavities. This risk increases with increasing pipe wall thicknesses.

JP 56-005 750 A describes a device for extruding plastics material profiles, to which device plasticised polymer melt can be fed and which comprises a plurality of annular conduits which are united to form a common melt conduit. Cooling conduits are arranged around these annular conduits.

DE 10 2005 031 747 A1 describes a method for the internal cooling of hollow plastics material profiles and an extruder for producing hollow plastics material profiles. In this case the internal cooling is achieved by conveying a cooling gas into the interior of the hollow profile, the cooling gas being produced in a Ranque-Hilsch vortex tube.

DE 10 2007 050 291 describes a mould for additional cooling of the melt, in which mould the melt strand is divided into a plurality of substrands.

In terms of processing, for example owing to the division into a plurality of flow conduits (which may all be cooled), the above-mentioned solutions are difficult to handle and involve very high production costs and a considerably high level of complexity when maintaining and cleaning the flow conduits.

In addition, the risk of the melt being able to mix with the coolant is very high, since the two flow chambers must be operated at very high internal pressures during extrusion operation and said chambers are separated from each other only by a simple steel surface seal.

SUMMARY

In an embodiment, the present invention provides an extrusion line for producing plastics material profiles including an extruder, a calibration station, and an additional piece of downstream equipment. A mold includes an internal cooling system having a branch for a coolant disposed inside the mold; wherein a coolant flow distribution is controllable.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
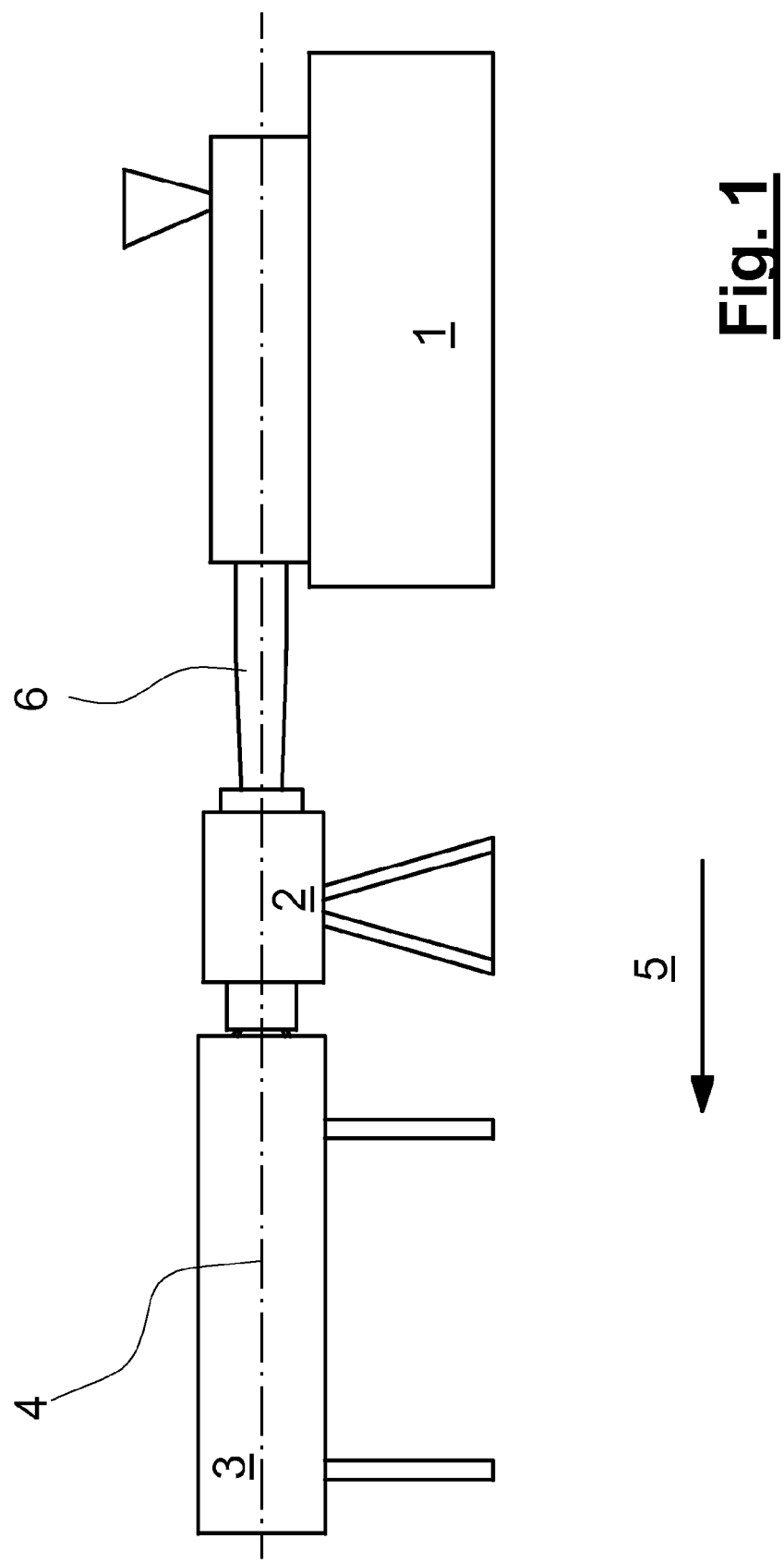
FIG. 1 shows an extrusion line.

In an embodiment, an aspect of the present invention provides an extrusion line comprising a mould, as well as a method in which the temperature of the mould can be controlled as simply and efficiently as possible. If possible, it should be possible to use the cooling air for pipe internal cooling and cooling of the mould.

The invention relates to an extrusion line for producing plastics material profiles, preferably plastics material pipes, comprising at least an extruder, a mould, a calibration station and further downstream equipment.

The invention further relates to a method for increasing the cooling efficiency of an extrusion line for extruding a plastics material profile, in particular a plastics material pipe, which method comprises the following steps: a) melting plastics material in an extruder, b) forming a plastics material strand and feeding the plastics material strand to a mould, c) forming a plastics material profile by means of the mould, d) calibrating and curing by cooling the profile in a calibration station.

In an embodiment, the mould comprises an internal cooling system, the flow distribution of which can be influenced, at least a branch for a coolant being arranged inside the mould.

Owing to this branch, which acts similarly to a bypass, it is possible for the coolant to be influenced in a targeted manner, and thus the amount which is directed through the mandrel is controlled.

The mould comprises, in a reasonable manner, a plurality of axial or radial cooling conduits which can be used individually for cooling. The drifting of the melt (caused by gravity) can thus be counteracted, in particular in the case of thick-walled pipes. The shear of the melt is influenced by this measure.

Thus, stronger cooling can be achieved in the upper region, for example. When a section through the mould perpendicular to the extrusion axis is viewed schematically, a plurality of cooling holes A are distributed at the periphery. Between the 10.30 and 1.30 positions (¼ of the periphery and exactly at the top), additional cooling holes B are provided, which can be opened or closed by means of flaps. Thus, the upper region can be cooled more strongly when necessary by opening the holes B. Obviously, this can also be increased by further holes C, whereby the shear is influenced (this in turn has an effect on the centring at the mould). It is thus possible, indirectly, to speak of thermal centring.

Cooling can be implemented in the mould. The holes need not necessarily be closed by means of flaps; a valve or an inflatable bellows is also conceivable. The entire amount of fluid and thus the fluid flow can be diverted via the branch (exhaust air duct) in such a way that it is not conveyed through the above-described holes.

The branch or bypass is advantageously configured as a pipe and is displaceable and/or rotatable along the extrusion axis.

In a further development, it is intended that the bypass be provided as a switching means and thus that it be made possible to connect or disconnect the bypass in a targeted manner or only to connect it in part. The flaps or holes, which can be displaced until congruent, thus form, as a whole, the switching means.

In addition, a targeted arrangement of cooling ribs is provided at the chambers through which the cooling air is to flow. As a result, the surface to be cooled is enlarged and the desired cooling effect is improved.

The outer mould surfaces can also be cooled by a central fan via corresponding bypasses of the main cooling air flow outside the tool.

Further reasonable developments are given in the dependent claims.

In embodiment of the present invention, the temperature of the plastics material strand in the mould is reduced before it exits the mould, the fluid flow inside the mould being controlled by means of a bypass, it being possible to open and close fluid openings in the bypass from 0% to 100%.

According to the development, during extrusion operation the bypass air is continuously metered from 0% to 100% by a switching device.

In a further development, it is provided that the temperature of the mould is regulated via the machine control system, in that the coolant is conveyed through the bypass to a greater or lesser extent. In other words, the inner flow surfaces of the mould (although this is also conceivable for the outer flow surfaces of the mould) can be adjusted to the temperatures required for the respective process by the combination of electrical strip heaters and targeted air cooling.

The bypass or the exhaust air duct is then advantageously thermally insulated. In addition, the feed-through conduits may also be thermally insulated.

The proposed method and the device according to the invention are adapted in particular for producing thick-walled pipes.

An extrusion line is shown schematically in FIG. 1, the extruder 1 being arranged to the side of the extrusion mould 2. Viewed in the extrusion direction 5, the calibration station 3 is connected downstream of the mould 2. Further downstream equipment such as a take-off and a separation device, should be non-cutting. For the air used for cooling is discharged counter to the extrusion direction through the extruded pipe, on through the mould and then upstream from the extruder. If the separation device is, for example, a conventional saw, the chips would also be drawn in or blown through the pipe. In the extrusion line which is shown by way of example, a plastics material pipe 6 is produced.

The calibration station 3 comprises a vacuum tank having a built-in calibration sleeve. Further cooling baths can also be connected to the calibration station.

Figure 2:
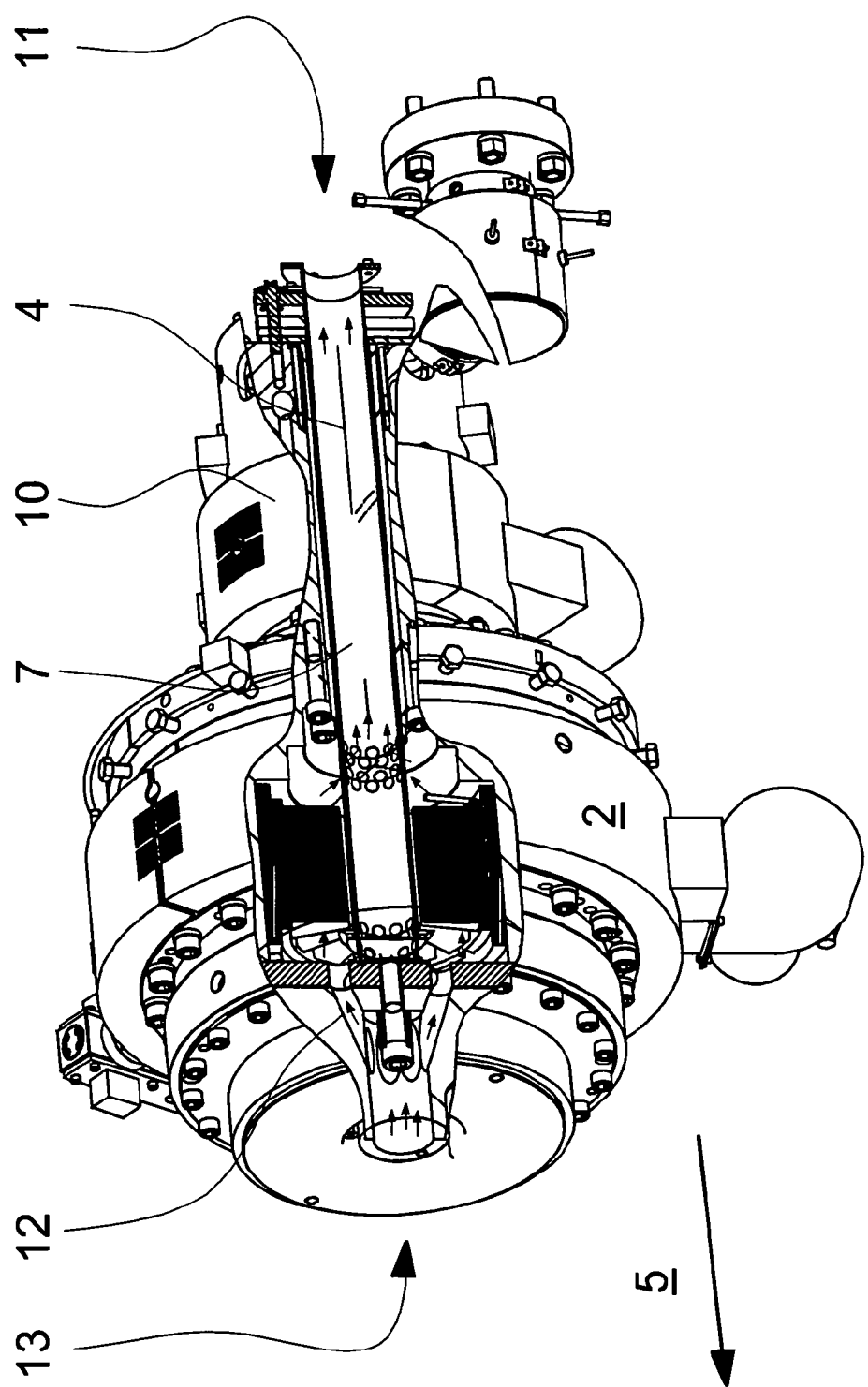
FIG. 2 is a perspective view of the mould.

FIG. 2 is a perspective view of the mould 2 according to the invention, the part which is essential to the invention around the extrusion axis 4 having been cut through. In this embodiment, an exhaust air duct 7 is arranged inside the mould 2. The melt is distributed via a spiral mandrel distributor 10 and fed to the melt conduits, which in the mould 2 pre-form the product to be extruded. A fluid 16 (symbolised by the arrows) is directed through the mould 2 counter to the extrusion direction 5. The fluid flow is divided into a plurality of feed-through conduits 12 and directed through the mould 2 counter to the extrusion direction to cool the mould 2 and thus to pre-cool the melt in the melt conduits.

Figure 3:
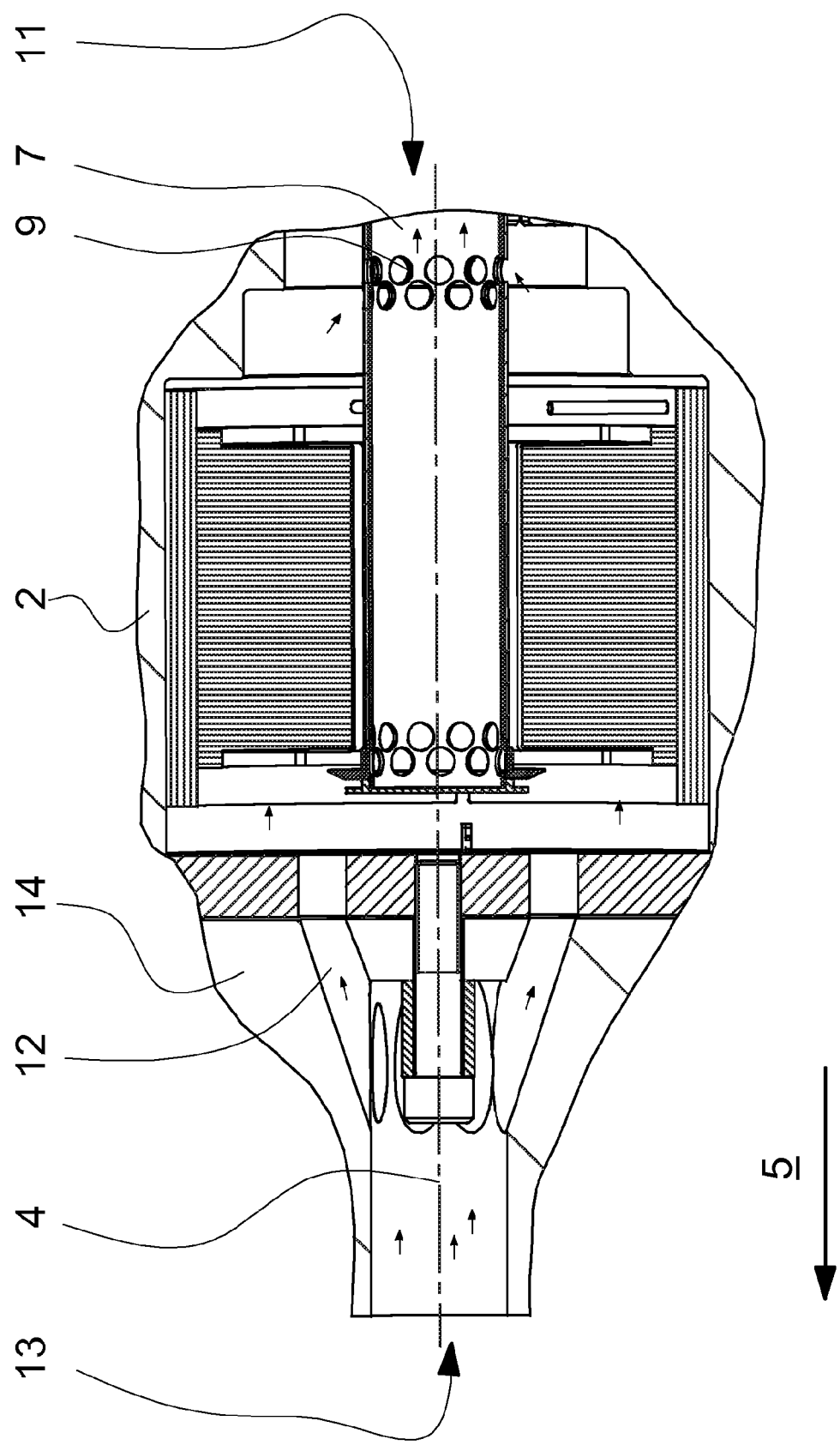
FIG. 3 is a section through the mould and
FIG. 4 is a further view comprising a section through the mould.

FIG. 3 shows in isolation the cut-through part from FIG. 2 of the mould 2 according to the invention, a section through the mould 2 along the extrusion axis 4 being shown. The inner feed-through conduits 12 are distributed uniformly around the mandrel 14 of the mould 2. The fluid flow (indicated by small arrows) flowing counter to the extrusion direction 5 enters the feed-through conduits 12 and is conveyed through the mould 2. After the fluid has flowed through the mould 2, it enters the exhaust air duct 7 via the fluid openings 9 on the side 11 near the extruder and is discharged outwards.

Figure 4:
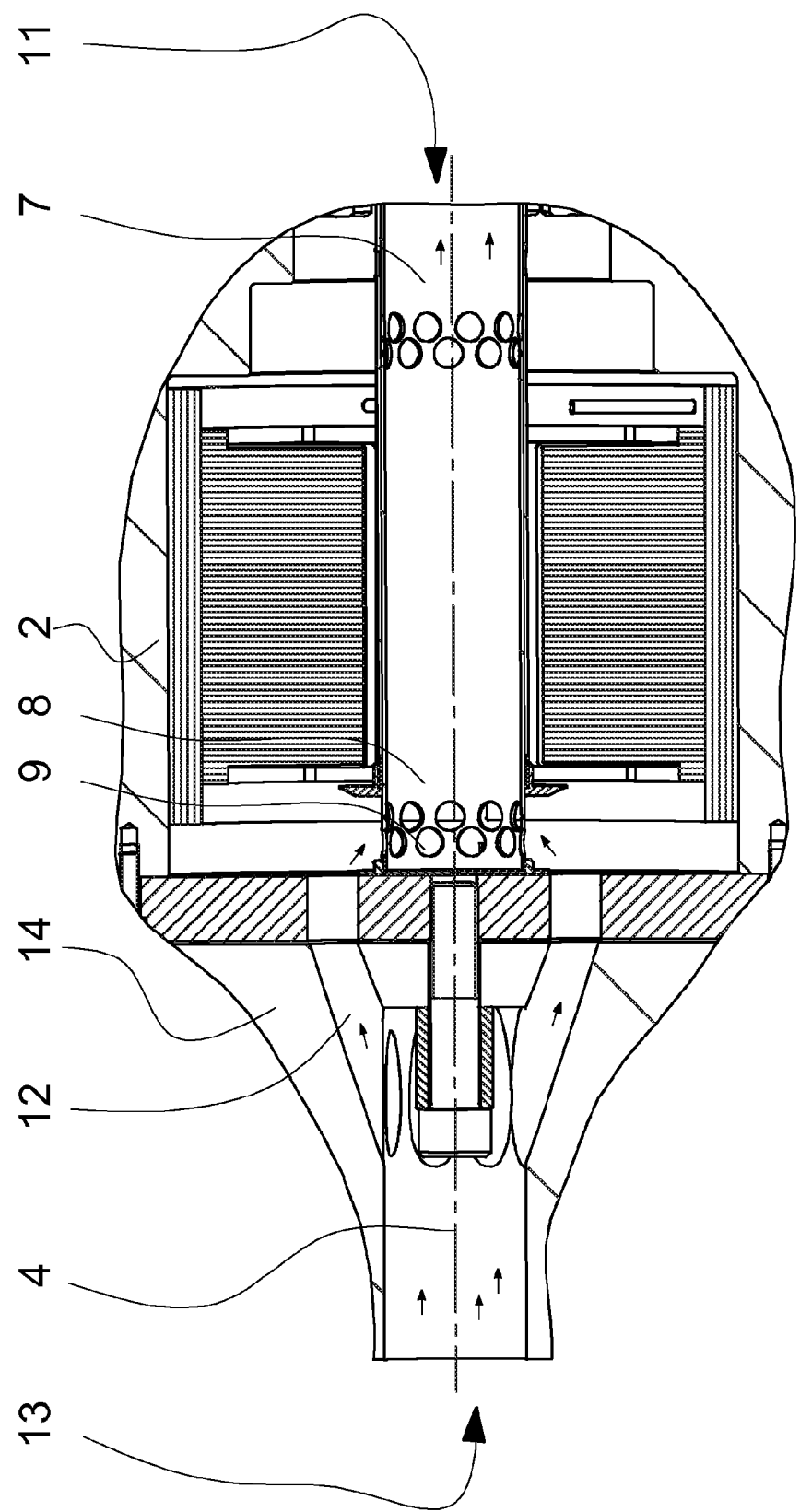

FIG. 4 basically corresponds to FIG. 3 and differs merely in that the exhaust air duct 7 is displaced in the extrusion direction 5. Owing to this axial displacement, the fluid openings 9 in the exhaust air duct 7 are exposed on the side 13 remote from the extruder. The fluid flow (again indicated by small arrows) flowing counter to the extrusion direction 5 can now enter the exhaust air duct 7 directly from the feed-through conduits 12 via the fluid openings 9, and be discharged outwards, without having to flow through the mould 2. The exhaust air duct 7 inserted in the centre of the mandrel 14 thus forms a bypass or branch in the mould 2.

By axial displacement of this exhaust air duct 7, the radial fluid openings 9 can be opened individually on the side near to or remote from the extruder. If necessary, an intermediate position can also be selected, in order to influence the fluid flow.

The displacement can be controlled or regulated manually from the outside, and/or electrically or pneumatically or hydraulically via the machine controls.

The coolant heated in this manner can be used as an energy carrier (for example, air), the dissipated energy being conveyed away from the pipe internal cooling and mould cooling system or, for example, be re-used to dry the granules.

Depending on the degree of axial displacement, the fluid openings 9 are held overlapped to a greater or lesser extent and thus variably in terms of their degree of openness.

The solution shown in this case comprising the fluid openings 9 can also be made in alternative embodiments. Thus, for example, flaps or valves are considered which can be opened or closed in order to influence the fluid flow. A displaceable pipe is also not necessarily required; a porous material can also be inserted, the permeability of which is influenced by the temperature.

Using the proposed method and the proposed device, it is thus possible in a simplified manner to dissipate heat uniformly or, as described above, in a targeted, non-uniform manner via the entire wall thickness of the pipe inside the mould.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 extruder
2 mould
3 calibration station
4 extrusion axis
5 extrusion direction
6 plastics material pipe
7 exhaust air duct
8 bypass in 2
9 fluid opening in 7
10 spiral mandrel distributor
11 side near extruder
12 feed-through conduit
13 side remote from extruder
14 mandrel

What is claimed is:

1. An extrusion line for producing plastics material profiles comprising:
   an extruder;
   a mold including an internal cooling system having a branch for a coolant disposed inside the mold, the branch including around its periphery a first plurality of fluid openings and a second plurality of fluid openings; wherein a distribution of a coolant flow of the coolant through the first plurality of fluid openings and the second plurality of fluid openings is controllable;
   a calibration station; and
   at least one additional piece of downstream equipment.

2. The line as recited in claim 1, wherein the plastics material profile includes a pipe.

3. The extrusion line as recited in claim 1, wherein the branch includes a switching device.

4. The extrusion line as recited in claim 3, wherein the branch includes an exhaust air duct one of displaceable along and rotatable about an extrusion axis.

5. The extrusion line as recited in claim 1, wherein a chamber receiving the coolant flow includes a targeted arrangement of cooling ribs, and wherein the coolant includes a gaseous fluid.

6. The extrusion line as recited in claim 1, wherein at least the mold includes a targeted arrangement of cooling ribs, and wherein the coolant includes a gaseous fluid.

7. A method for increasing a cooling efficiency of an extrusion line for extruding a plastics material, the method comprising:
   melting the plastics material in an extruder;
   forming a plastics material strand;
   feeding the plastics material strand into a mold, the mold including an internal cooling system having a branch for a coolant, the branch including around its periphery a first plurality of fluid openings and a second plurality of fluid openings;
   forming a plastics material profile using the mold;
   reducing a temperature of the plastics material strand in the mold before an exiting of the mold by controlling a flow of the coolant through the first plurality of fluid openings and the second plurality of the fluid openings, the fluid openings being configured to be opened or closed from 0% to 100%; and
   calibrating the plastics material profile and curing the plastics material profile by cooling the plastics material profile in a calibration station.

8. The method as recited in claim 7, further comprising continuously metering bypass air from 0% to 100% using at least one switching device.

9. The method as recited in claim 7, further comprising regulating a temperature of the mold by one of increasing and decreasing the fluid flow through the bypass via a machine control system.

10. The method as recited in claim 7, further comprising regulating a temperature of the mold by heating regions of the mold using electrical heating elements via a machine control system.

* * * * *